United States Patent
Shachar et al.

(10) Patent No.: US 7,009,991 B2
(45) Date of Patent: Mar. 7, 2006

(54) RESERVATION-BASED MEDIA ACCESS CONTROLLER AND RESERVATION-BASED OPTICAL NETWORK

(75) Inventors: Shlomo Shachar, Tel-Aviv (IL); Oren Moshe, Givataime (IL)

(73) Assignee: Matisse Networks, Palo Alto, CA (US)

( * ) Notice: Subject to any disclaimer, the term of this patent is extended or adjusted under 35 U.S.C. 154(b) by 164 days.

(21) Appl. No.: 10/157,871

(22) Filed: May 31, 2002

(65) Prior Publication Data

US 2003/0185229 A1 Oct. 2, 2003

Related U.S. Application Data

(60) Provisional application No. 60/367,786, filed on Mar. 28, 2002.

(51) Int. Cl.
*H04J 4/00* (2006.01)

(52) U.S. Cl. .................. 370/436; 370/443; 370/478; 398/47

(58) Field of Classification Search .......... 370/252, 370/337, 344, 345–348, 430, 436, 437, 442, 370/443, 458, 478, 480, 332, 498, 238, 450, 370/223; 398/123, 7, 8, 47, 75, 99; 359/237, 359/325, 119; 455/12.1; 375/356; 709/200, 709/238, 223; 385/16
See application file for complete search history.

(56) References Cited

U.S. PATENT DOCUMENTS

| 5,191,626 | A | | 3/1993 | Stern | |
|---|---|---|---|---|---|
| 5,500,857 | A | * | 3/1996 | Nakata | ........... 370/440 |
| 5,696,903 | A | | 12/1997 | Mahany | |
| 6,415,312 | B1 | * | 7/2002 | Boivie | ........... 709/200 |
| 6,477,288 | B1 | * | 11/2002 | Sato | ........... 385/16 |
| 6,502,140 | B1 | * | 12/2002 | Boivie | ........... 709/238 |
| 6,680,912 | B1 | * | 1/2004 | Kalman et al. | ........... 370/238 |

FOREIGN PATENT DOCUMENTS

GB        2 282018         3/1995

OTHER PUBLICATIONS

Wen et al., "Routing, Wavelength and Time–Slot Assignment in Time Division Multiplexed Wavelength–Routed Optical WDM Networks", 2002, IEEE INFOCOM, pp 1442–1450.*

Srinivasan et al., "A Generalized Framework for Analyzing Time–Space Switched Optical Networks", 2002, IEEE, pp 202–215.*

"A New Approach to the Maximum–Flow Problem", Goldberg et al, Journal of the Association for Computing Machinery, vol. 35, No. 4, Oct. 1988, pp 921–940.

"Open Shop Scheduling to Minimize Finish Time", Gonzalez et al, Journal of the Association for Computing Machinery, vol. 23, No. 4, Oct. 1976, pp 665–679.

(Continued)

*Primary Examiner*—John Pezzlo
(74) *Attorney, Agent, or Firm*—Squire, Sanders & Dempsey L.L.P.

(57) ABSTRACT

A method and apparatus for reserving bandwidth in a network includes a series of elements. A demand matrix is calculated, for bandwidth requirements based upon communication needs among a plurality of nodes on the network. An integer number of time slots is provided, aligned around the network. Bandwidth is reserved for node-to-node communication based upon the demand matrix. The reserving of bandwidth reserves bandwidth between two nodes based upon time-slot alignment. Transmission is scheduled between the two nodes by reservation of wavelengths and time slots.

29 Claims, 10 Drawing Sheets

OTHER PUBLICATIONS

"SR³: A Bandwidth–Reservation MAC Protocol for Multimedia Applications over All–Optical WDM Multi-Rings", Marsan et al, IEEE, 1997.

Hornet, "Hybrid Opto–Electronic Ring Network" website, http://ocrl.stanford.edu/hornet/hornet.html, dated Feb. 4, 2002, pp. 1–3.

Aura Ganz et al., "A Time–Wavelength Assignment Algorithm for a WDM Star Network", INFOCOM 1992, vol. 3, Jan. 1992, pp. 2144–2150.

Sendag, R. et al., "Routing and Wavelength Assignment in Optical Passive Star Networks with Non–uniform Traffic Load", vol. 3, Nov. 25, 2001, pp. 1435–1439.

Elek, V. et al., Photonic Slot Routing: A Cost–Effective Approach to Designing All–Optical Access and Metro Networks, IEEE Communications, vol. 39, No. 11, Nov. 2001, pp. 164–171.

* cited by examiner

Time-slot reservation map

Time-slots overlap

Master node
Origin singularity at
the origin

Reservation map time-slots $\tilde{X}$ = X modulo M

- Allocated time-slot
- Blocked time-slot (due to allocated time-slot)

Node Transmitting slot clock

RESERVATION-BASED MEDIA ACCESS CONTROLLER AND RESERVATION-BASED OPTICAL NETWORK

CROSS REFERENCE TO RELATED APPLICATIONS

This application claims priority of U.S. Provisional Patent Application Ser. No. 60/367,786 entitled "Reservation-Based Media Access Controller and Reservation-Based Optical Network," filed on Mar. 28, 2002, the contents of which are hereby incorporated by reference.

BACKGROUND OF THE INVENTION

1. Field of the Invention

The present invention is directed to optimizing bandwidth and efficiency in an all-fiber network. Dynamic all-fiber optical networks utilize fast tunable lasers for single-hop optical routing over a uni-directional fiber ring. Access to the ring is provided by a media access controller (MAC), wherein each node has a dedicated wavelength, and the fiber can simultaneously carry a plurality of dedicated wavelengths. Each fiber therefore has a number of wavelengths which matches the number of nodes. The tuned outgoing wavelengths from each node are received by the correspondingly tuned receiver in the destination node. The tunable wavelength, therefore, is used on a per-packet basis to send the packet at the wavelength of the intended recipient node.

2. Description of the Related Art

Such prior art networks are referred to as synchronous and slotted networks, the fiber ring is essentially divided into a plurality of time slots, with the time slots rotating uni-directionally around the ring. In some cases, two rings can be used with each node transmitting the same data on each ring, but in opposite directions. Each node can transmit a packet only within the boundaries of a time slot. The length of the time slot is typically fixed. Scheduling of packets is typically performed through the scheduling of wavelengths and time slots. In order to avoid collisions in time slots, only one node can transmit on each wavelength. Once a time slot has a packet at a particular wavelength, no other node can transmit in that time slot at that wavelength thereby freeing the wavelengths at that time slot.

The MMR and the SRR works (By Marco Ajmone Marsan, Andrea Bianco, Emilio Leonardi, A. Morabito, and Fabio Neri) are dealing with a slotted all-optical multi-ring topology. The MAC algorithm presented in these works is based on carrier-sense ability of each node and a fairness algorithm to prevent nodes starvation. The carrier-sense feature gives the network the ability to adapt transmission resources according to the traffic. Thus the network bandwidth can be used more optimally. However, this approach has also a drawback that the algorithm lacks the ability to reserve bandwidth; consequently the network does not support constant bit-rate traffic. One version of this issue was being dealt in the $SR^3$ algorithm developed by the same authors ("$SR^3$: A Bandwidth-Reservation MAC Protocol for Multimedia Applications over All-Optical WDM Multi-Rings", Marco Ajmone Marsan, Andrea Bianco, Emilio Leonardi, A. Morabito, Fabio Neri). The $SR^3$ algorithm is also based on the carrier-sense idea with additional capability of reserving bandwidth between two nodes. The reserve bandwidth between from source node to a specific destination node can be up to 1/N of the bandwidth (N is the number of nodes). Although the $SR^3$ supports reservation and thus supports constant bit-rate traffic, the reservation limitation, which increases as the number of the nodes increases, limits the bandwidth that can be allocated to constant bit-rate traffic. Furthermore the carrier-sense approach requires a fairness algorithm in order to avoid node starvations. The fairness algorithm base on the SAT token can cause large delays. The delays created by the fairness algorithm causes that a fairness-based networks cannot transport delay sensitive traffic, such as voice/video traffic. In order to improve the fairness algorithm and minimize the delays an improved fairness algorithm was proposed by I. Cidon, L. Georgiadis, R. Guerin, and Y. Shavitt ("Improved Fairness Algorithm for Rings with Spatial Reuse").

SUMMARY OF THE INVENTION

The present invention is therefore directed to a method of reserving bandwidth in a network, with the method including the steps of providing a network with a plurality of nodes, and calculating a demand matrix for bandwidth requirements based upon communication needs among the plurality of nodes. An integer number of time slots is provided, aligned around the network. Bandwidth is reserved for node-to-node communication based upon the demand matrix. The reserving of bandwidth includes reserving bandwidth between two nodes based upon time-slot alignment. Transmission is scheduled between two nodes by reservation of wavelength and time slots.

The invention is also directed to a method of creating a reservation map for communications. The method comprises the steps of creating a demand matrix based upon demand data from a plurality of nodes connected on the network, and configuring a bipartite graph based upon the demand matrix and a series of collision groups. An unallocated time slot is selected from a plurality of time slots in a reservation frame. The time slot has a maximum number of allocation constraints among the unallocated time slots. The bipartite graph is modified based upon the allocation constraints of the time slot. Indications of the allocation constraints are removed from the bipartite graph. A maximum matching set is created for the adjusted bipartite graph, and a weight of original graph edges included in the maximum matching set is decremented. A reservation map time slot is created for the selected time slot based upon the maximum matching set. Time slot constraint data is updated according to the maximum matching set.

The invention is also directed to a method of communicating data between nodes on an optical fiber ring network. The method comprises the steps of generating demand data for each node of a plurality of nodes in an optical fiber ring network, and creating a demand matrix in at least one node of the plurality of nodes. The demand matrix is based upon the demand data. A reservation map is created for each wavelength and each time slot of a reservation frame comprising a plurality of time slots and a plurality of wavelengths, thereby reserving bandwidth on a per time slot and per wavelength basis.

The invention is also directed to a media access controller for a network, with the media access controller comprising a demand matrix unit for generating a demand matrix based upon bandwidth requirements for node-to-node communication. A reservation map unit is provided, for creating a reservation map based upon the demand matrix, and based upon allocation constraints for time slots and wavelengths in a reservation frame. The reservation map unit utilizes maximum matching data for communication among a plurality of nodes on the network.

The invention is also directed to a communications node for an optical fiber network, with the communications node including a fixed wavelength receiver for receiving optical data at a predetermined wavelength, and a tunable wavelength transmitter for transmitting optical data to destination nodes at a plurality of destination wavelengths. A media access controller is provided, which creates a reservation map for reserving time slots and wavelengths for transmitting data to the plurality of nodes based upon available time slots and wavelengths in the optical fiber ring. The reservation map is based upon demand data from the plurality of nodes.

The invention is also directed to systems including the various means for performing the methods and implementing the elements discussed above.

BRIEF DESCRIPTION OF THE DRAWINGS

For proper understanding of the invention, reference should be made to the accompanying drawings, wherein.

DETAILED DESCRIPTION OF THE PREFERRED EMBODIMENT

Figure 1A:
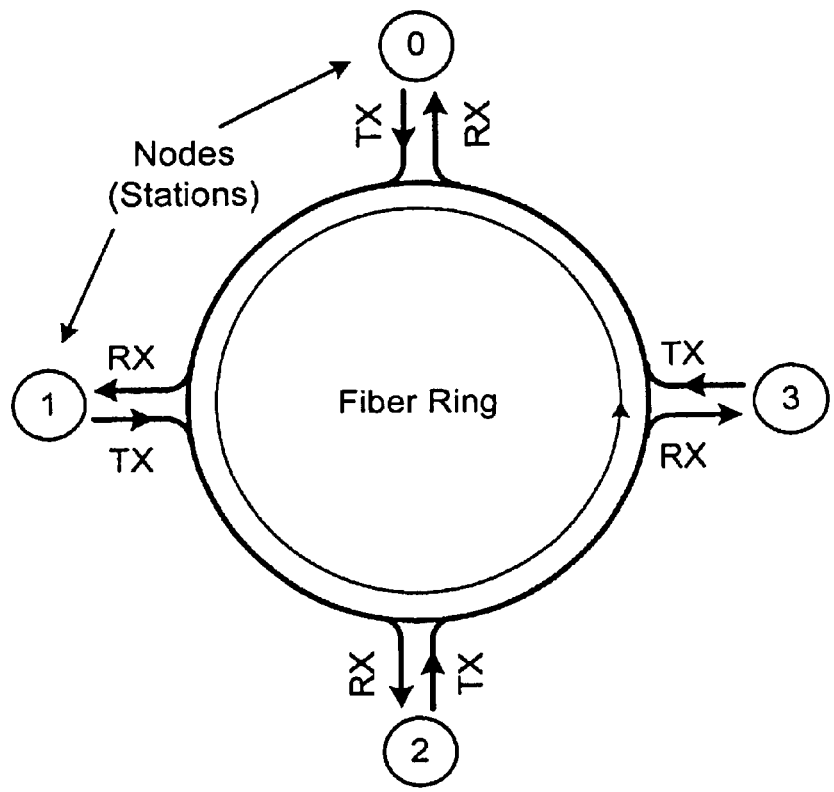
FIG. 1A illustrates an optical fiber network having a plurality of nodes.
Figure 1B:
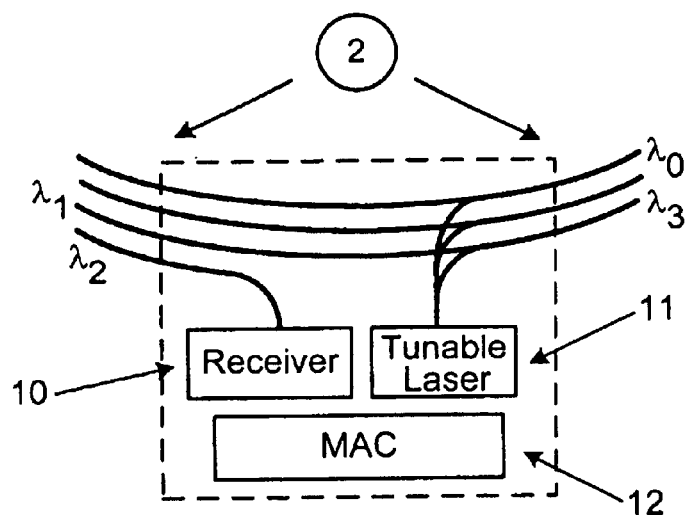
FIG. 1B illustrates a receiver, tunable laser, and MAC as provided in each node.

The invention is therefore directed to a system and method for all-optical network, in which nodes are equipped with ultra-fast tunable laser transmitter 11 and a fixed receiver 10, as shown in FIG. 1. In addition the invention defines any one of the nodes as a master-node, or origin-node. The master-node can be any of the network nodes, and may perform additional tasks such as clock distribution and reservation algorithm execution within MAC 12.

Figure 2:
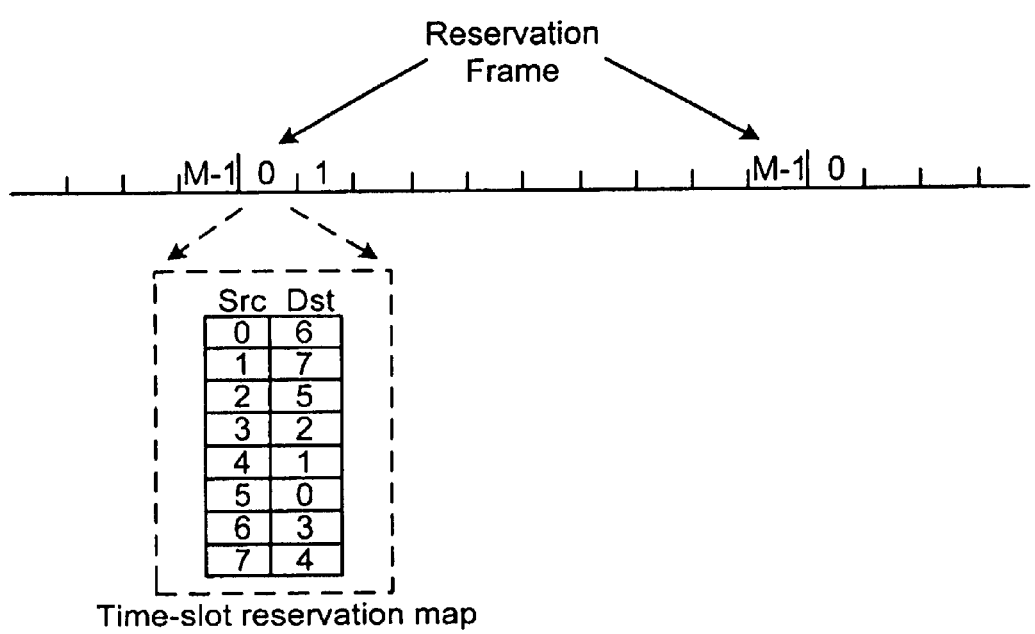
FIG. 2 illustrates a reservation frame and a time-slot reservation map.

The all-optical fiber-ring topology enables to establish up to N connections simultaneously, wherein N equals the number of nodes or/and wavelengths. In order to maximize the number of connections, a collision free MAC should be used. The MAC uses a reservation mechanism, in which a set of connections is predefined for each time-slot. The connection set is defined in a way that collisions do not occur, i.e. two nodes do not transmit in same wavelength at the same time-slot. Generally, a reservation based MAC requires that time-slots will be tagged. This way all nodes will associate the same time-slots with the same reservation. The MAC tags time-slots with incremented numbers from 0 to M−1 repeatedly. M continuously time-slots (from 0 to M−1) formed a reservation frame as illustrated in FIG. 2. All time-slots with the same tag number have the same reservation definition.

To synchronize all the nodes on the time-slots tags, the master-node may transmit packets at time-slot number zero to each of the nodes. Each node receiving the synchronization packet resets its local modulo M counter. After that, the counter is incremented every time-slot, and nodes can rely on the counter for the current time-slot tag.

Given that there are M different time-slots, the reservation map includes M time-slot reservations or sets. An M×N matrix, where M is the reservation frame size and N is the number of nodes/wavelengths, represents the reservation map. The columns of the matrix represent the reservation slots, the rows represent the source nodes/wavelengths and the values represent the destination nodes/wavelengths.

Figure 3:
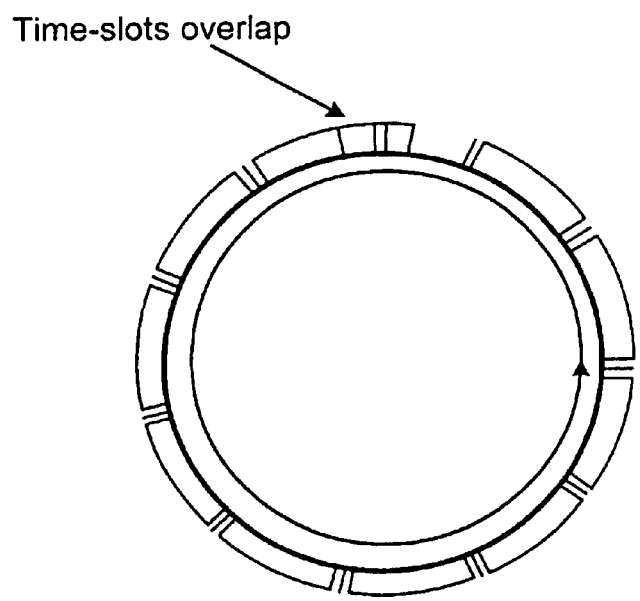
FIG. 3 illustrates time slots around an optical fiber ring, and illustrates a collision at the origin.

On a ring topology, the use of a reservation frame requires a special attention to the ring length. Time-slots transmitted to the left merge into time-slots that arrive from the right. Consequently to keep an accurate merge of time-slots at the origin (the master-node location), the ring length must be equal to an integer number of time-slots. If the ring length is not an integer number of time-slots, the tail time-slot overlaps the head time-slot, as illustrated in FIG. 3, which may causes collisions.

In order to keep the time-slots from overlapping, time-slots boundaries may be locked by a single source. For example, the master-node can transmits the time-slots clock on a dedicated wavelength. The transmitted clock will propagate around the ring and will return to the master-node. Then, a locking mechanism at the master-node can set the time-slots duration to eliminate the time-slots overlapping. In this case, the ring length and the time-slot size can be determined by time-slot clock adjustments. Because the residue divides between all the time-slots on the ring, the adjustment needed equals to the residue divided by the number of time-slots. The advantage of the reservation allocation algorithm is that the fiber-ring length needs only to be an integer number of time-slots and not an integer number of reservation frames.

Figure 4:
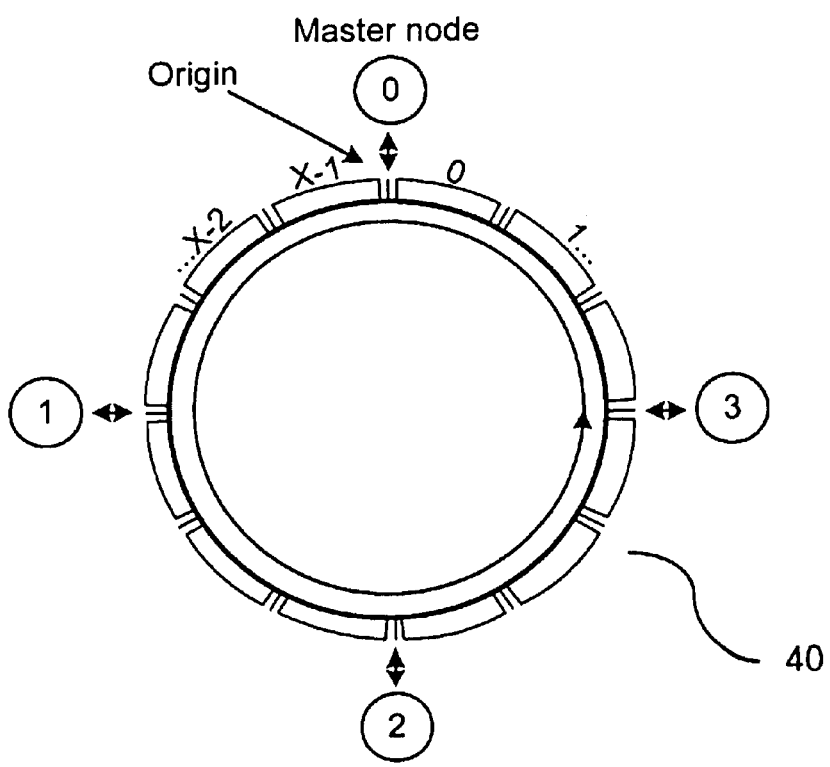
FIG. 4 illustrates time-slots and nodes around the ring.

FIG. 4 illustrates ring 40 with length equal to an integer number of time-slots. Transmitted time-slots from the master-node go around the ring and return to the origin, located at master node 0. At the origin, old time-slots merge into the new time-slots. We define X as the number of time-slots in the ring modulo M (number of time-slots in a reservation frame). If X equals to zero then the mergers are between time-slots with the same tag, and the same reservation. Therefore, an independent reservation map, in which time-slots reservations are independent of other time-slots reservation, can be used. This is the simple case, and the algorithm for computing the reservation map is equivalent to the maximum matching problem on an N-to-N bipartite graph. This problem has a known solution such as the one described in "Open shop scheduling to minimize finish time", by T. Gonzalez and S. Sahni, Journal for the Association for Computing Machinery, Vol. 23, No. 4, October 1976. The contents of this publication is non-essential to the understanding of the present invention, and is hereby incorporated by reference. An illustration of a bipartite graph solving a maximum matching problem will be discussed below with respect to FIG. 8, and therefore, a more detailed description is not necessary.

On a practical system the ring length cannot be constantly set, and thus a synchronization method should be applied to maintain synchronization even if the fiber-ring length changes due to temperature changes and aging. However, to maintain ring length with an integer number of reservation frames is not practical. For example on a system in which M equals to 128 and time-slot duration is 2 microseconds, the ring's length granularity, and minimum length is 25.6 Km. That is why practical systems should rely on a ring length with only an integer number of time-slots requirement. With this requirement the ring's length granularity and minimum length is for example only 400 m.

In a case in which the number of time slots X is not equal to zero, the mergers are between time-slots with a different reservation. Therefore, to build a collision free reservation map, the dependent reservation map algorithm described below may be used.

Since different wavelengths do not collide, the dependent reservation map problem can be divided into N different problems. Each problem represents a different wavelength. Moreover, the fact that each wavelength is dropped some where in the ring simplifies the problem. For each destination or different wavelength the source nodes are classified into two collisions groups—the source nodes that their packets cross the origin enroute to the destination and the source nodes that their packets do not cross the origin enroute to the destination.

Figure 5:
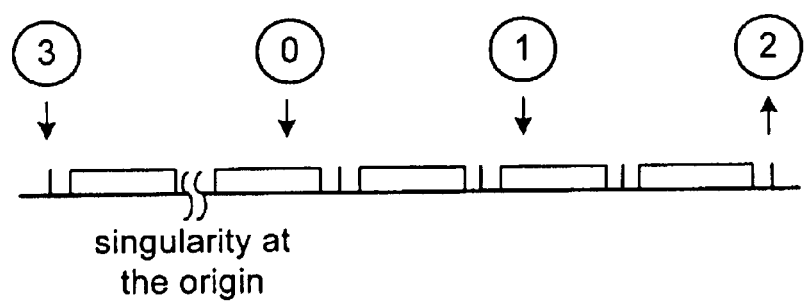
FIG. 5 illustrates a single wavelength path for an optical network.

FIG. 5 illustrates the path around the ring for a wavelength W2. The wavelength W2 is dropped at node 2, and thus the first node that can add it to the ring is node 3. As shown above the overlapping problems occur only when packets are crossing the origin.

Figure 6:
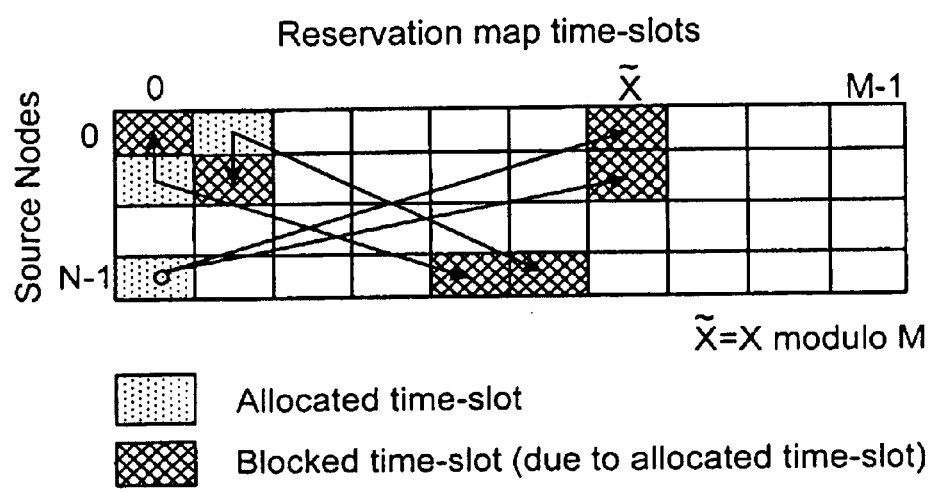
FIG. 6 illustrates a dependent reservation map according to the invention.

Examination of the path of W2 shows that time-slot k of node 3 overlaps with time-slot (k+X) modulo M of nodes 0 and 1. Thus, the dependent reservation map algorithm must not allocate time-slot k to node 3 and time-slot (k+X) modulo M to node 0 or 1. However it can allocate time-slot k to node 3 and 0. FIG. 6 shows an example to dependent reservation map for wavelength W2. At time-slot 0, both node 3 and node 1 transmit wavelength W2 and on time-slot 1 node 0 transmits it. The cross-filled cells represent time-slots in which transmitting wavelength W2 is not allowed due to allocation constraints.

Figures 7, 8:
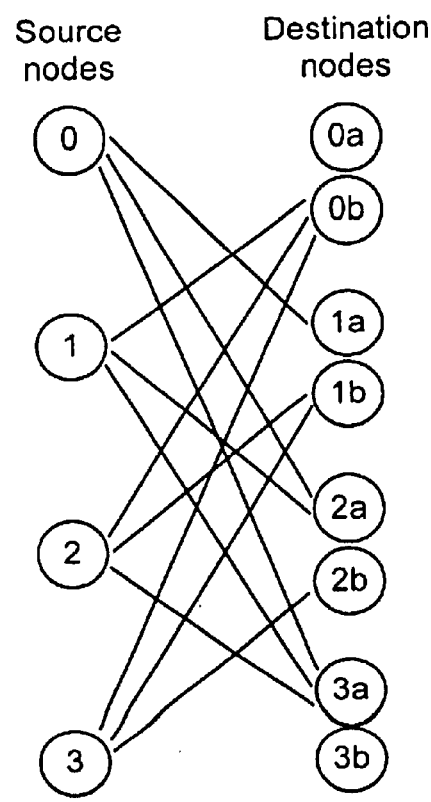
FIG. 7 illustrates a demand matrix according to the invention.
FIG. 8 illustrates a matching bipartite graph addressing allocation.

As mentioned previously, the building of the dependent reservation map can be converted into a maximum matching problem in a bipartite graph. FIG. 8 shows a bipartite graph representing the problem for four nodes. The left nodes represent the source nodes and the right nodes represent the destination nodes in the two collision groups. The collision group and the edges between the nodes are defined according to the demand matrix. To solve the reservation problem there is a need to find a maximum matching for each reservation slot in the reservation frame. The maximum matching problem may be solved using, for example, the known HK algorithm ("An $n^{2.5}$ algorithm for maximum matching in bipartite graphs", J. E. Hopcroft and R. M. Karp.

The variables and initial conditions for the dependent reservation map can be as follows:

1. There are N nodes around the ring. Nodes identification is from 0 to N−1, starting at the master-node with id #0 and incrementing in the direction of the transmission.
2. Reservation frame consist of M continuous time-slots.
3. X is the number of time-slots around the ring modulo M. (modulo stands for the residue in integer division and is also marked as "%", i.e. X % M is the same as X modulo M).
4. The demand matrix, marked as D, is N×N matrix which fulfills—
   a. d(s,d) is the demand from node s to node d in number of time-slots per reservation frame $$\left(\text{equals to } TransmissionBitRate \times \frac{d(s,d)}{M} \text{bandwidth}\right)$$

b. $d(i,i)=0, \forall i | 0 \leq i < N$ c. $\sum_{i=0}^{N-1} d(i,d) \leq M, \forall d | 0 \leq d < N$ d. $\sum_{i=0}^{N-1} d(s,i) \leq M, \forall s | 0 \leq s < N$ 5. $K_0, \ldots, K_{M-1}$ are constrain groups for the M reservation map time-slots.
6. B is the constrained time-slots group.
7. F is the non-constrained time-slots group.
8. G(S∪T,E) is a bipartite graph with vertex set S∪T and edges set E (if (i,j) is an edge in E then i∈S,j∈T or i∈T, j∈S). S is a set of vertices representing source-nodes $\{S_0, S_1, \ldots, S_{N-1}\}$, while T is the set representing destination-nodes & collision groups $\{T_{0,0}, T_{0,1}, T_{1,0}, T_{1,1} \ldots T_{N-1,0}, T_{N-1,1}\}$. w(i,j) represents the weight of edge (i,j) in E.
9. R is the reservation map N×M matrix. r(s,m) is the destination node/wavelength which is reserved to source node s at time-slot m. If r(s,m)=−1 then there is no reservation for source node s at time-slot m.

Based upon the variables and conditions discussed above, the dependent reservation map is then constructed according to the following steps:

1. Build a bipartite graph according to the demand matrix and the collision groups.
2. Select a time-slot from the unallocated time-slots, which has the maximum constraints (allocation constraints).
3. Set the bipartite graph according to the selected time-slots constraints, in a way that allocation-constraints vertices and the edges connected to them are removed from the original graph.
4. Find maximum matching set for the adapted graph.
5. Decrease by one the weight of the original graph edges, which are included in the maximum matching set.
6. Update the reservation map time-slot according to the maximum matching set.
7. Update the time-slots constraints according to the maximum matching set.
8. If there is still an edge in the original graph, which has positive weight, go to step number 2, otherwise end algorithm.

Mathematically, the construction of the reservation map is illustrated as follows:

Procedure Dependent_Reservation_Map (X, D, R)
// Initialization
$K_m \leftarrow \{\phi\}, \forall m | 0 \leq m < M$ $B \leftarrow \{\phi\}$
$F \leftarrow \{0, 1, 2, \ldots, M-1\}$
$r(s,m) \leftarrow -1, \forall s,m | 0 \leq s < N, 0 \leq m < M$
// Bipartite Graph initialization $$w(S_i, T_{j,0}) = \begin{cases} d(i, j), & j > i \\ 0, & \text{otherwise,} \end{cases} \quad w(S_i, T_{j,1}) = \begin{cases} d(i, j), & j < i \\ 0, & \text{otherwise} \end{cases}$$

Figure 13:
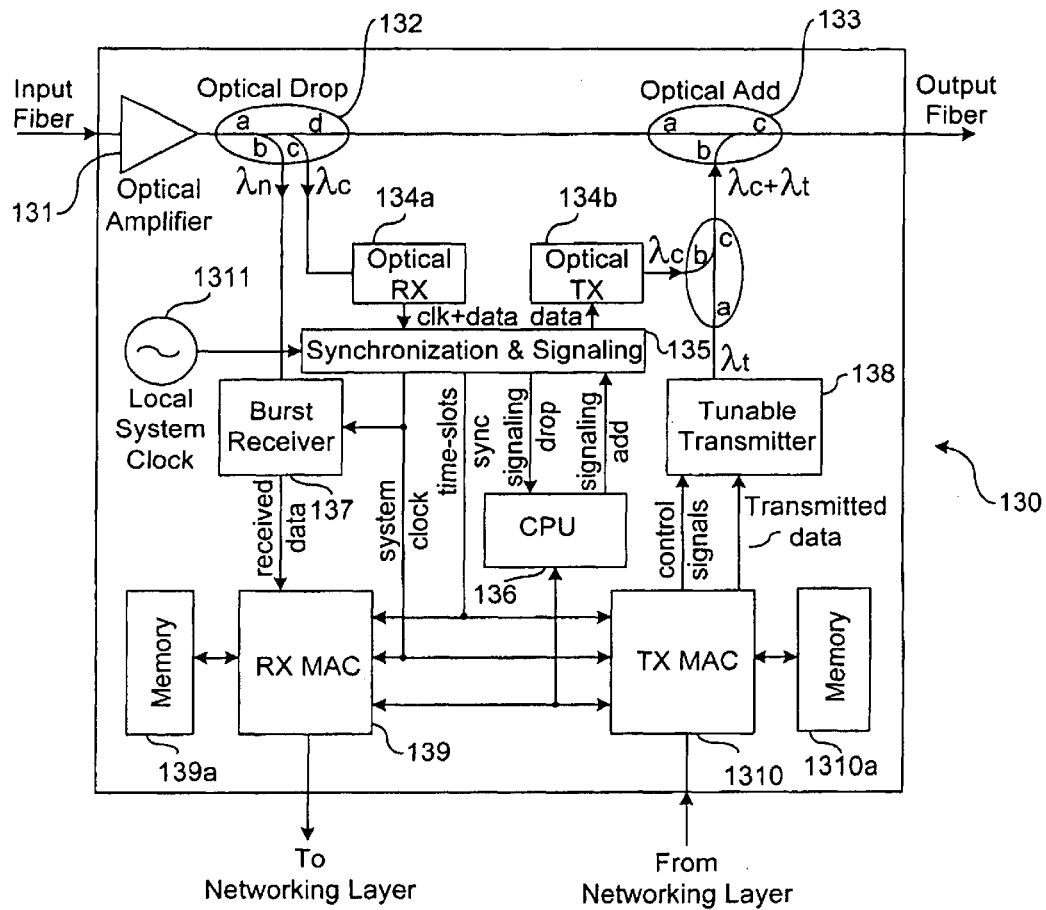
FIG. 13 illustrates a hardware implementation of a node according to the invention.

$E \leftarrow \{(S_i, T_{j,g}) | \forall (S_i, T_{j,g}) | w(S_i, T_{j,g}) > 0\}$
$S \leftarrow \{S_0, S_1, \ldots S_{N-1}\}$
$T \leftarrow \{T_{0,0}, T_{0,1}, T_{1,0}, T_{1,1} \ldots T_{N-1,0}, T_{N-1,1}\}$
Define Bipartite Graph $G(S \cup T, E)$
// Loop
While ($F \neq \{\phi\}$ or $B \neq \{\phi\}$ and there is $w(S_i, T_{j,g}) > 0$)
   // Select Time-slot
   If $B \neq \{\phi\}$
     $v \leftarrow \{b | \|K_b\| \geq |K_l| \forall b, l \in B\}$
     $B \leftarrow B - \{v\}$
   Else
     $v \leftarrow \{b | b \in F\}$
     $F \leftarrow F - \{v\}$
   Order_TimeSlot(v,X,R,K,F,B,G)
End-While
End-Procedure
Procedure Order_TimeSlot(v,X,R,K,F,B,G)
// Find Maximum Matching
$\overline{T} \leftarrow T - K_v$
$\overline{E} \leftarrow E - \{(i,j) \in E | i \in K_v, j \in K_v\}$
Define Bipartite Graph $\overline{G}(S \cup \overline{T}, \overline{E})$
Find graph $\overline{G}$ maximum matching $C = \{(S_i, T_{j,g}), \ldots\}$
// Decrease weight from the matching set edges
$w(S_i, T_{j,g}) \leftarrow w(S_i, T_{j,g}) - 1, \forall w(S_i, T_{j,g}) | (S_i, T_{j,g}) \in C$
// Update the reservation map matrix
$R(i,v) \leftarrow j, \forall j | (S_i, T_{j,g}) \in C$
// Update the time-slots constraints
$v1 \leftarrow (M - X + v) \text{ modulo } M$
$v2 \leftarrow (X + v) \text{ modulo } M$
$K_{v1} \leftarrow \{T_{j,1}, \forall T_{j,1} | (S_i, T_{j,0}) \in C\}$
$K_{v2} \leftarrow \{T_{j,0}, \forall T_{j,0} | (S_i, T_{j,1}) \in C\}$
$B \leftarrow B + v1 + v2$
$F \leftarrow F - v1 - v2$
End-Procedure FIG. 13 illustrates one example of a node implementation for an optical network based utilizing a MAC as described above. The optical network is built from several nodes connected by an optical fiber ring (FIG. 1).

The proposed node implementation in this example is based on the following assumptions—

1. Each node in the network has the same implementation, except for different wavelength drop ($\lambda_n$).
2. One node in the network is defined as master-node. The master-node broadcasts the system clock and time-slot synchronization.
3. The network synchronization is done using dedicated common wavelength ($\lambda_c$) that is received by each node and retransmitted (daisy-chain). The common wavelength can also be used as a signaling channel between the nodes.

The node 130 that is illustrated in FIG. 13 is connected to an optical ring using fiber-in input and fiber-out output. In order to compensate on the network losses it is possible, in one configuration to connect an optical amplifier 131 in the node entrance. The optical amplifier 131 can be a low-gain amplifier which is located in each node, or a high-gain amplifier which is located in some but not necessarily all of the nodes.

Following the optional optical amplifier 131, the optical signal pass subsequently thru a dual optical-drop element 132 and a wide optical add element 133. The dual optical-drop element 132 is used to filter out and drop the node-wavelength and common-wavelength from the passing optical signal. The drop element has one optical input (a) and three optical outputs (b, c, d). The optical signal, includes of multiple wavelengths, comes into input (a) and splits to three optical signals—the node-wavelength which comes out of output (b), the common-wavelength which comes out of output (c), and all the other wavelengths which come out of output (d). The wideband optical add element 133 is used to add the transmitted-wavelength and the retransmitted common-wavelength to the optical signal. This element should be a wideband since the transmitted-wavelength can be from a variety of wavelengths. The passing optical signal comes into input (a) and combines with the transmitted signal that comes into input (b). The sum of the signals comes out from output (c).

The synchronization module includes an optical transceiver including receiver 134a and transmitter 134b and synchronization logic block 135. The optical receiver 134a receives the dropped common-wavelength, recovers the data and clock, and converts the optical signal to an electrical signal. The electrical signal is processed by the synchronization logic 135 which synchronizes on the digital frame and extracts the time-slot synchronization. If the common-wavelength is used also as a signaling channel between the nodes the logic block drops and adds signaling packets, which are processed by CPU 136.

On the receive side, the dropped node-wavelength comes into an optical burst mode receiver 137. The optical burst mode receiver includes of an amplifier, fast-locking CDR (clock data recovery) and a demux element; it extracts the packet from the optical signal and converts it to electrical signal. On the transmit side the transmitted packet is transmitted on the scheduled wavelength using an optical tunable transmitter 138. The transmitter wavelength and the common-wavelength and both added to the fiber-ring.

The RX-MAC module 139 handles the packets which are extracted by the burst mode receiver. The RX-MAC module handles the packets queuing and forwards the packets to the networking layer. The TX-MAC 1310 receives packets from the networking layer, handles the packets queuing and forwards the packets to the tunable transmitter according to the reservation map scheduling. In order to improve the BER performance it is possible to combine in the RX-MAC 139 a forward error correction decoder and an encoder in the TX-MAC 1310.

RX-MAC 139 is connected to memory 139a for appropriate storage and buffering of packets; similarly, TX-MAC 1310 is connected to memory 1310a. These memories can be DRAM, SRAM, SDRAM, or any other suitable memory type of a suitable memory size based upon the particular application and network requirements. It should be noted that node 130 can be provided with a remote system clock, or local system clock 1311.

The main tasks of the CPU 136 are the algorithm tasks of calculating the demand-matrix, creating the reservation map, and handling the system signaling channel.

Calculating the reservation map can be done using two approaches—centralized and distributed. In the centralized approach slave-nodes transmit the demand vectors to the master-node. The master-node builds from the demand vectors a demand-matrix and calculates an appropriate reservation map. The reservation map is then broadcast to the slave-nodes using the common channel. In the distributed approach each node broadcasts its demand vectors to the other nodes. Then, nodes build the demand-matrix from the demand vectors and create an appropriate reservation map locally. In large networks the centralized method is recommended since the reservation map calculation requires a large-processing power that can effectively be located only in a single node. However, based on available computing power, the distributed approach can be feasible even in large networks.

Figure 14:
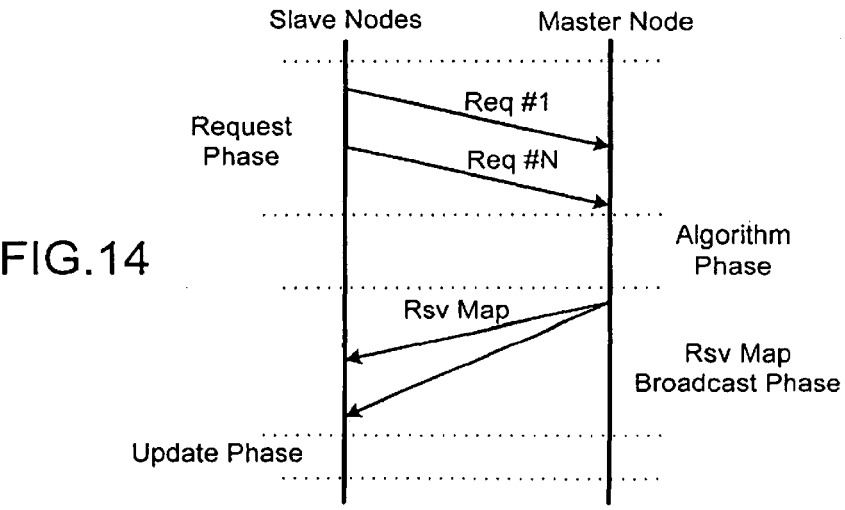
FIG. 14 illustrates resource allocation between slave nodes and a master node.
Figure 15:
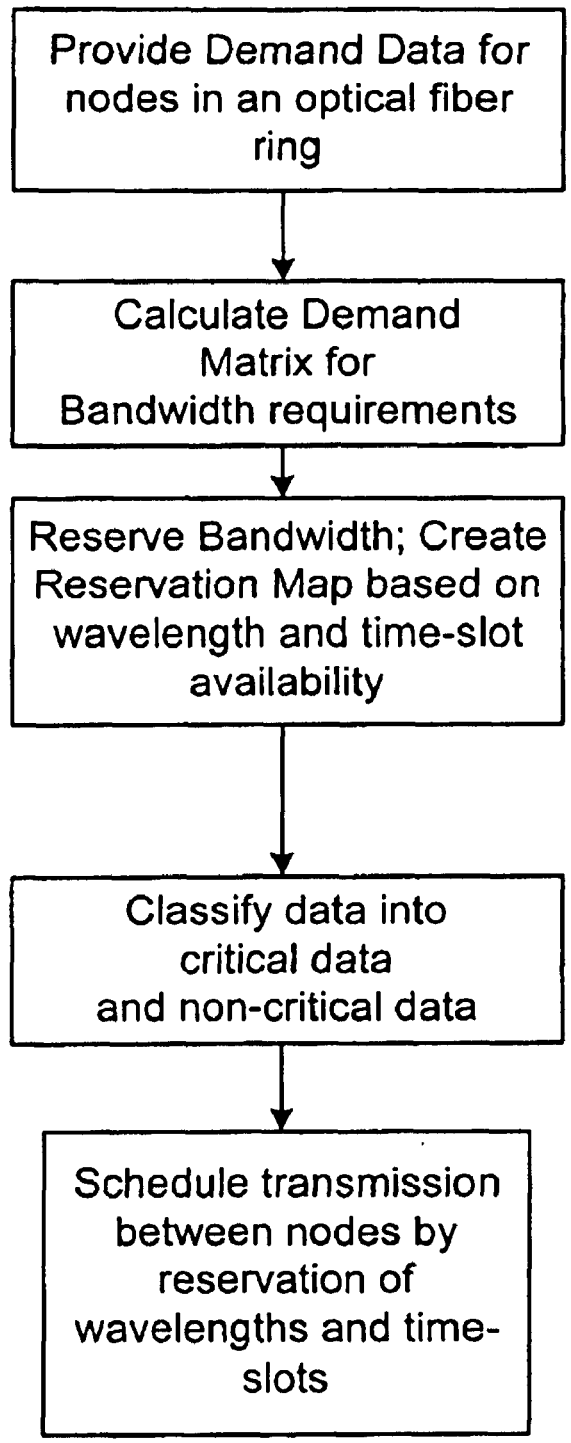
FIG. 15 illustrates a method of reserving bandwidth according to an embodiment of the invention.

FIG. 14 illustrates the negotiation phases between the slave-nodes and the master-node, to compute reservation map in a centralized approach. The negotiations in this case, are done in an out-of-band signaling channel, such as the common-wavelength channel.

In phase 1, the request phase, the slave-nodes transmit their demand vectors (resource demands for each other destination node) to the master node. Two types of demand vectors are transmitted to the master node—The committed bandwidth vector, and the best-effort bandwidth vector. The committed bandwidth vector specifies the number of time-slots per reservation map the node need for each of its destination nodes. The best-effort bandwidth vector specifies the number of time-slots per reservation map the node optimally wants. This vector will also specify the priority of the best-effort resource demands; in order to let the master node divides the best-effort bandwidth between all of the network nodes.

Following the receiving all the slave-nodes demand vectors, the master node is calculating the reservation map in Phase 2, the algorithm phase. The algorithm will first allocate the committed bandwidth between all the nodes and then will divide the extra bandwidth according to the best-efforts demands and priorities. At the end of this stage the master node will have a new reservation table optimized to the nodes' demands.

After the master node builds the reservation map it distributes it to the slave node in Phase 3, which is a reservation map distribution phase. The distribution of the reservation map is done via the broadcast channel or thru the in-band channels. The distribution of the reservation map must be performed before the predefine update time is reached.

Phase 4, the global update phase, occurs cyclic every R (R is predefined) reservation frame between time-slot M−1 and time-slot 0. When the update time is reached nodes replace the current reservation map with the latest reservation map. The global update at the same time-slot assures that time-slots will relate to the same reservation map, and collisions will not take place. Node that didn't receive a new reservation map from the last update time will stop transmitting when a new update time is reached. This will avoid a scenario in which the node fails to receive a new reservation map and keeps transmitting according to the old reservation map.

Figure 9:
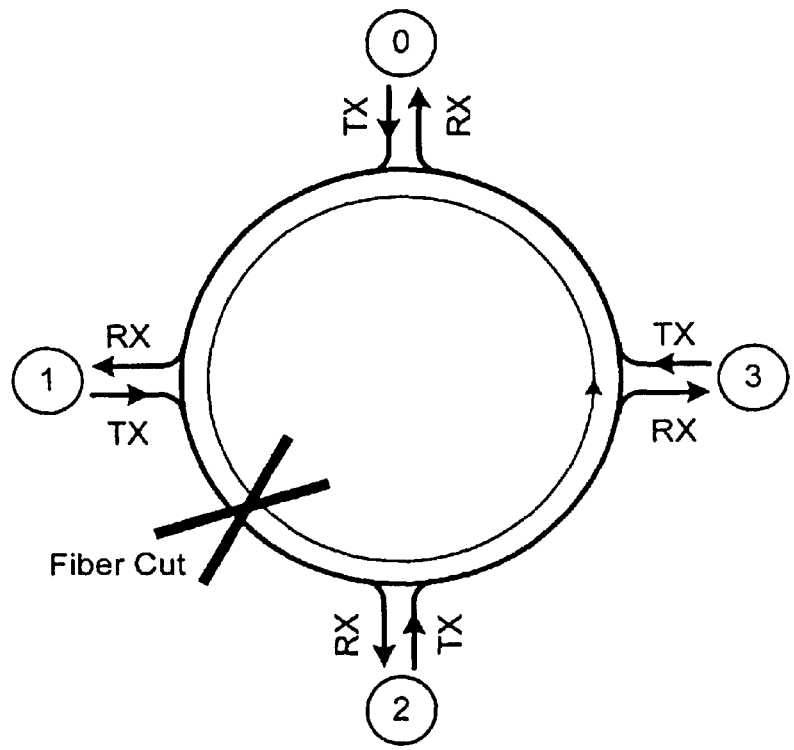
FIG. 9 illustrates an optical fiber ring encountering a fiber cut scenario.
Figure 10:
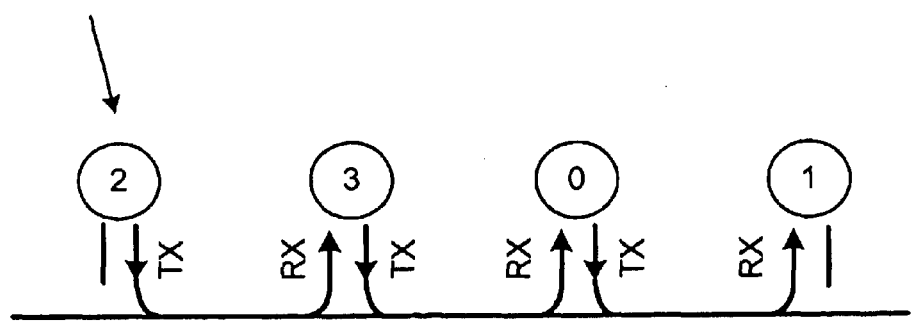
FIG. 10 illustrates a single fiber network topology after a fiber cut.

One of the important issues in optical network is the network protection. Carrier-class networks are demanded to guarantee "fife-nines" (99.999%) service availability, even if a single failure occurs. The most fatal failure in optical ring networks is a fiber cut, as illustrated in FIG. 9. This failure is more critical in all-optical networks since it influences half of the source-destination paths. To support the carrier-class standard, synchronized optical packet ring networks are required to have a protection scheme, which will handle link failures. To achieve that, dual counter-rotating rings should be implemented. This is a known solution from other optical network such as SONET, however in the all-optical network a fiber-cut failure requires a different reconfiguration scheme. In the SONET-like solutions, after a fiber-cut, each node receives a valid data stream from at least one side (west or east) and thus simply selects the valid data stream. In the all-optical fiber-ring, after a fiber-cut, the two rings become dual unidirectional busses. This new configuration requires a new reservation map; one which will take into accounts that connection to a destination node, might be available only from a single direction. Possible connections between the nodes are lower and dependent on their positions. The two nodes on the edges of the bus suffer a cut of half the original bit rate. This is caused because there is only one direction to which they can receive and transmit data. The middle node, for example, has still full capacity. Since the fiber is cut, the new reservation map can be computed using an independent reservation map, which is a faster algorithm. Still, the reconfiguration time (detection time+algorithm execution time) might require more than the 50 mSec allowed by SONET. This is why critical services (such as SONET traffic) should be handled differently than non-critical services (such as IP traffic). As can be seen, a single cut doesn't cut-off any node, although it probably lowers its capacity. In order to recover as quickly as possible, critical connections between any two nodes should duplicate on the two separate fibers. In this method, when the connection is cut-off from one direction, the same packets can be taken from the unaffected direction. Although there is a bandwidth waste when the system operates normally, a fast-connection recovery is guaranteed in times of failure. Non-critical connections, which are less sensitive to reconfiguration time, are transmitted only on a single ring. This way, up to twice bandwidth can be achieved, time-critical traffic gets to the destination in a timely manner, and non-critical traffic reaches the destination after the new reservation map is configured.

Figure 11:
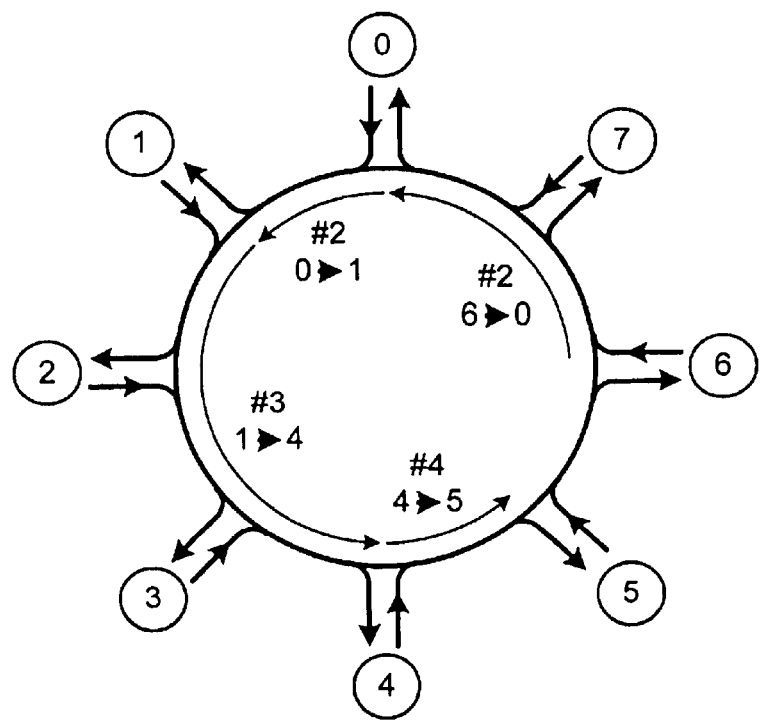
FIG. 11 illustrates a daisy-chain multicast example.

Many current and future applications may require a multicast ability. On a single ring, multicasting to a sub-group is typically done through all of the nodes, which are located between the sub-group nodes. Each node has to drop the packets, examine their addresses and forward them, even if the packets are not addressed to it. Multicast is then transformed into broadcast, which means that the node theoretical capacity is not exploited and there is a waste of bandwidth. In an all-optical fiber-ring topology, source nodes transmit packets directly to the destination nodes, not involving any other nodes on the ring. A multicast tree can easily be formed by daisy-chain connections between the nodes in the multicast sub-group. This is a daisy chain multicast as illustrated in FIG. 11. The node that initiates the multicast transmission transmits the multicast packets directly to the first member of the multicast group. The receiving node, in its turn, transmits the same packet directly to the next node on the list. Aside from the nodes on the multicast tree, no other nodes are involved.

Figure 12:
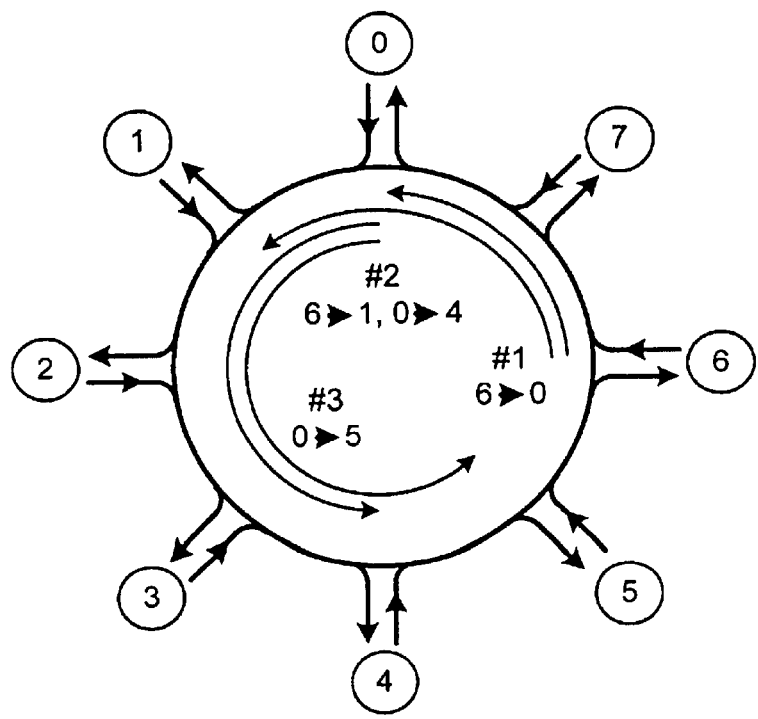
FIG. 12 illustrates a spanning tree multicast example.

When the multicast tree is too large, and the multicast packet delay of the last nodes can be too large. The invention may use a spanning-tree multicast (FIG. 12). In the spanning-tree multicast, each receiving node duplicates the packet and transmits it to two other nodes in the multicast-group. This causes the multicast delay short form $O(N)$ on the daisy-chain method to $O(Log_2 N)$. Nevertheless this method requires additional bandwidth, which increases by bandwidth requirements by a factor of two when compared to the daisy chain method.

In other words, with reference to FIG. 12, if a packet is being multicast from node 6 to nodes 0, 1, 4, and 5. On the first time-slot node 6 transmits to node 0. On the next time-slot node 6 transmits to node 1 and node 0 transmits to node 4. On the last time-slot node 0 transmit to node 5. This significantly decreases latency to node 5, but can, as discussed above, increase bandwidth requirements due to the fact that node 6 has to transmit the packet twice. In the daisy-chaining method, as illustrated in FIG. 11, node 6 would transmit the packet to node 0 in time slot 0, and then node 0 would broadcast the packet to node 1 in the following time slot, and node 1 would then broadcast the packet directly to node 4, which, when received, would broadcast the packet directly to node 5. While requiring less bandwidth, this introduces additional latency to node 5.

In summary, the invention is directed to a reservation-based media access controller which is capable of providing a full reservation optical network. The invention is also directed to an optical network which implements the full reservation algorithm, and methods of providing full reservation optical communication utilizing reservation of time-slots and wavelengths. Various configurations of an optical network and the nodes thereof can be provided, as discussed herein, and the media access controller can be created based upon a plurality of discrete components configured to form a functioning unit, and can also be formed on a single semiconductor substrate.

Figure 16:
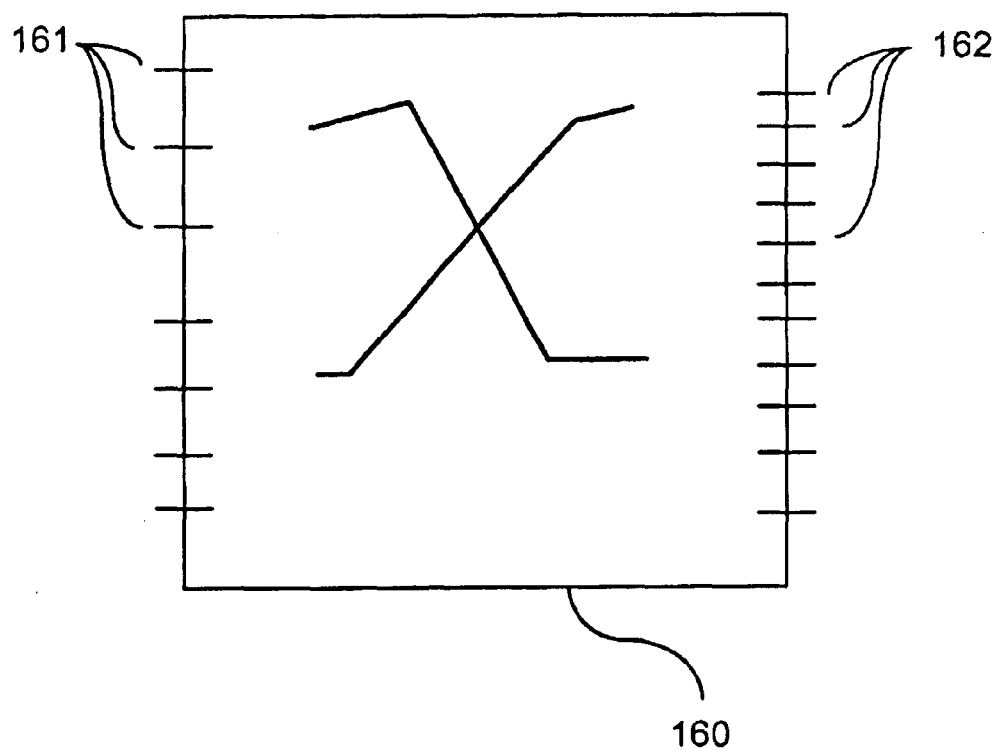
FIG. 16 illustrates an embodiment of the invention applied to a network switch such as a cross bar switch.

The above discussion of the invention is directed to implementation on a fiber-optic ring network. It should be noted, however, that the invention is applicable to other types of networks, including more conventional copper-type networks. The demand matrix and the reservation map algorithms and configurations, as discussed above, could be applicable to, for example, a network switch such as a cross-bar switch as illustrated in FIG. 16. Cross-bar switch 160 has a plurality of ports 161 and 162. The ports can be configured to communicate with each other by using a series of buses and a series of time slots, based upon availability. The invention discussed above, including the discussion of the demand matrix and reservation map, is applicable to the reservation of the plurality of buses and the plurality of time slots in a cross-bar switch 160. Other configurations of the invention, both in fiber-optic and copper or wired configurations, is within the scope of person of skill in the art. Although the embodiments discussed above are specific to time-slots and wavelengths in a fiber-optic ring, the disclosed methods and systems are applicable for reserving bandwidth in one or more queues which may have limited access to a resource such as a bus, and conventional packet information such as source address, destination address, VLAN identification information, class-of-service (COS) information, and other packet handling data.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method of reserving bandwidth in a network, said method comprising the steps of:
   providing a network having a plurality of nodes thereupon;
   calculating a demand matrix for bandwidth requirements based upon communication needs among the plurality of nodes;
   providing any integer number of time slots aligned around the network, in which alignment is provided through synchronization;
   reserving bandwidth for node-to-node communication based upon the demand matrix, said reserving of bandwidth including reserving bandwidth between two nodes based on time-slot alignment; and
   scheduling transmission between the two nodes by reservation of wavelengths and time slots through a reservation map based upon at least the demand matrix.

2. A method of reserving bandwidth in a network as recited in claim 1, wherein said step of providing an optical fiber network having dual optical fiber rings.

3. A method as recited in claim 2, wherein said method includes a step of classifying data into critical and non-critical data, wherein critical data is transmitted on a first fiber ring and a second fiber ring of said dual fiber rings, and wherein non-critical data is transmitted on the first fiber ring.

4. A method as recited in claim 3, wherein said method includes the steps of:
   determining an occurrence of a fault in said first or second fiber ring;
   re-calculating the demand matrix based upon the occurrence of the fault; and
   transmitting non-critical packets on an appropriate one of said first and second fiber rings so as to reach a destination node.

5. A method as recited in claim 1, said method including a step of transmitting a multicast packet from a source node to a plurality of destination nodes, said step of transmitting comprises transmitting the packet to a first node among the plurality of destination nodes, then transmitting the packet from the source node to a second node of said plurality of nodes;
   upon receipt of the packet, each receiving node then transmits the packet to two additional destination nodes, until all destination nodes have received the packet.

6. A method as recited in claim 1, said method including a step of transmitting a multicast packet from a source node to a plurality of destination nodes, said step of transmitting comprises transmitting the packet from the source node to a first two destination nodes, and wherein each of said first two destination nodes transmits the packet to two other destination nodes, whereby each destination node forwards the packet to two additional destination nodes until all appropriate nodes have received the packet.

7. A method as recited in claim 1, said method including a step of transmitting a multicast packet from a source node to a first destination node, and wherein said first destination node forwards the packet to a second destination node, and wherein the second destination node forwards the packet to a third destination node, with this process continuing until all destination nodes have received the multicast packet.

8. A method as recited in claim 1, wherein said step of reserving bandwidth comprises constructing a reservation map based upon at least the demand matrix and collision groups.

9. A method of reserving bandwidth in a network, said method comprising the steps of:

providing a network having a plurality of nodes thereupon;

calculating a demand matrix for bandwidth requirements based upon communication needs among the plurality of nodes;

providing an integer number of time slots aligned around the network;

reserving bandwidth for node-to-node communication based upon the demand matrix, said reserving of bandwidth including reserving bandwidth between two nodes based on time-slot alignment; and scheduling transmission between the two nodes by reservation of wavelengths and time slots;

wherein said step of reserving bandwidth comprises constructing a reservation map based upon the demand matrix and collision groups; and wherein said step of constructing a reservation map comprises the steps of:

configuring a bipartite graph based upon the demand matrix and a series of collision groups;

selecting an unallocated time slot from a plurality of time slots in a reservation frame, said time slot having a maximum number of allocation constraints among the unallocated time slots;

modifying the bipartite graph based upon the allocation constraints of said time slot, wherein indications of said allocation constraints are removed from the bipartite graph;

creating a maximum matching set for the adjusted bipartite graph;

decrementing a weight of original graph edges included in the maximum matching set;

creating a reservation map time slot for the selected time slot based upon the maximum matching set; and updating time slot constraint data according to the maximum matching set.

10. A method as recited in claim 9, said method including the step of:

decrementing a weight of graph edges which are included in the maximum matching set.

11. A method as recited in claim 3, wherein said non-critical data is transmitted only on the first fiber ring, and not on the second fiber ring, unless a fault is detected.

12. A method as recited in claim 1, wherein said method reserves bandwidth in an optical fiber ring network.

13. A method as recited in claim 1, wherein said method reserves bandwidth in a local area network.

14. A method of creating a reservation map for communications, said method comprising the steps of:

creating a demand matrix based upon demand data from a plurality of nodes connected on a network;

configuring a bipartite graph based upon the demand matrix and a series of collision groups;

selecting an unallocated time slot from a plurality of time slots in a reservation frame, said time slot having a maximum number of allocation constraints among the unallocated time slots;

modifying the bipartite graph based upon the allocation constraints of said time slot, wherein indications of said allocation constraints are removed from the bipartite graph;

creating a maximum matching set for the adjusted bipartite graph;

decrementing a weight of original graph edges included in the maximum matching set;

creating a reservation map time slot for the selected time slot based upon the maximum matching set; and updating time slot constraint data according to the maximum matching set.

15. A method as recited in claim 14, comprising the further steps of:

determining the existence of a fault in the network;

re-creating a demand matrix based upon the determination;

transmitting a selected packet on a first fiber in a first direction, or in a second fiber in a second direction, depending upon a location of a destination node.

16. A method of communicating data between nodes on an optical network, said method comprising the steps of:

generating demand data for each node of a plurality of nodes in an optical network;

creating a demand matrix in at least one node of said plurality of nodes, said demand matrix being based on said demand data, creating a reservation map for each wavelength and each time slot of a reservation frame comprising a plurality of time slots and a plurality of wavelengths, thereby reserving bandwidth on a per time slot and per wavelength basis; wherein any integer number of time slots are aligned around the optical network, in which alignment is provided through synchronization.

17. A method as recited in claim 16, further comprising a step of:

determining the existence of a fault in the optical network;

re-creating a demand matrix based upon the determination;

transmitting a selected packet on a first fiber in a first direction, or in a second fiber in a second direction, depending upon a location of a destination node.

18. A media access controller for a network, said media access controller comprising:

a demand matrix unit for generating a demand matrix based upon bandwidth requirements for node-to-node communication; and a reservation map unit for creating a reservation map based upon the demand matrix, and based upon allocation constraints for time slots and wavelengths in a reservation frame, wherein the reservation map unit utilizes maximum matching data for communication among a plurality of nodes on the network and the media access controller enables any integer number of time slots to be aligned around the network, in which alignment is provided through synchronization.

19. A communications node for an optical fiber network, said communications node comprising:

a fixed wavelength receiver for receiving optical data at a predetermined wavelength;

a tunable wavelength transmitter for transmitting optical data to destination nodes at a plurality of destination wavelengths; and a media access controller which creates a reservation map for reserving time slots and wavelengths for transmitting data to the plurality of nodes based upon available time slots and wavelengths in the optical fiber ring, said reservation map being based upon a demand matrix wherein the media access controller enables any integer number of time slots to be aligned around the network, in which alignment is provided through synchronization.

20. A communications node as recited in claim 19, wherein said node includes a demand matrix generating unit for generating a demand matrix based upon demand data from the plurality of nodes, and wherein said reservation map is based upon said demand matrix.

21. A communications node as recited in claim 19, wherein said reservation map is created based upon demand matrix data transmitted from another of said plurality of nodes.

22. A media access controller as recited in claim 18, wherein said demand matrix unit and said reservation map unit are configured for operation with an optical ring network.

23. A media access controller as recited in claim 18, wherein said demand matrix unit and said reservation map unit are configured for operation with a local area network.

24. A media access controller for a network, said media access controller comprising:
    a demand matrix unit for generating a demand matrix based upon bandwidth requirements for node-to-node communication;
    a reservation map unit for creating a reservation map based upon the demand matrix, and based upon allocation constraints for time slots and wavelengths in a reservation frame,
    wherein the reservation map unit utilizes maximum matching data for communication among a plurality of nodes on the network; and
    wherein said reservation map unit creates said reservation map by configuring a bipartite graph according to the demand matrix, by selecting a first time-slot from a plurality of unallocated time-slots, said first time slots being selected based upon a maximum number of allocation constraints, updating the bipartite graph based upon the selected first time slot, wherein allocation-constraint vertices, and edges connecting them, are removed, selecting a second time slot from the plurality of unallocated time slots, said second time slots having an updated maximum number of allocation constraints, updating the bipartite graph based upon the second time slot, determining a maximum matching set for the updated graph, and updating the reservation map based upon the maximum matching set.

25. A communications node for an optical fiber network, said communications node comprising:
    a fixed wavelength receiver for receiving optical data at a predetermined wavelength;
    a tunable wavelength transmitter for transmitting optical data to destination nodes at a plurality of destination wavelengths; and
    a media access controller which creates a reservation map for reserving time slots and wavelengths for transmitting data to the plurality of nodes based upon available time slots and wavelengths in the optical fiber ring, said reservation map being based upon demand data from the plurality of nodes;
    wherein said media access controller is configured to create said reservation map by configuring a bipartite graph according to the demand matrix, by selecting a first time-slot from a plurality of unallocated time-slots, said first time slots being selected based upon a maximum number of allocation constraints, updating the bipartite graph based upon the selected first time slot, wherein allocation-constraint vertices, and edges connecting them, are removed, selecting a second time slot from the plurality of unallocated time slots, said second time slots having an updated maximum number of allocation constraints, updating the bipartite graph based upon the second time slot, determining a maximum matching set for the updated graph, and updating the reservation map based upon the maximum matching set.

26. A system for reserving bandwidth in a network, said system comprising:
    interface means for interfacing with a network having a plurality of nodes thereupon;
    calculating means for calculating a demand matrix for bandwidth requirements based upon communication needs among the plurality of nodes;
    providing means for providing any integer number of time slots aligned around the network, in which alignment is provided through synchronization;
    reserving means for reserving bandwidth for node-to-node communication based upon the demand matrix, said reserving of bandwidth including reserving bandwidth between two nodes based on time-slot alignment;
    scheduling means for scheduling transmission between the two nodes by reservation of wavelengths and time slots through a reservation map based upon at least the demand matrix.

27. A system for reserving bandwidth in a network, said system comprising:
    interface means for interfacing with a network having a plurality of nodes thereupon;
    calculating means for calculating a demand matrix for bandwidth requirements based upon communication needs among the plurality of nodes;
    providing means for providing an integer number of time slots aligned around the network;
    reserving means for reserving bandwidth for node-to-node communication based upon the demand matrix, said reserving of bandwidth including reserving bandwidth between two nodes based on time-slot alignment;
    scheduling means for scheduling transmission between the two nodes by reservation of wavelengths and time slots;
    further comprising:
    creating means for creating the demand matrix based upon demand data from a plurality of nodes connected on a network;
    configuring means for configuring a bipartite graph based upon the demand matrix and a series of collision groups;
    selecting means for selecting an unallocated time slot from a plurality of time slots in a reservation frame, said time slot having a maximum number of allocation constraints among the unallocated time slots;
    modifying means for modifying the bipartite graph based upon the allocation constraints of said time slot, wherein indications of said allocation constraints are removed from the bipartite graph;
    creating means for creating a maximum matching set for the adjusted bipartite graph;
    decrementing means for decrementing a weight of original graph edges included in the maximum matching set;
    creating means for creating a reservation map time slot for the selected time slot based upon the maximum matching set; and updating means for updating time slot constraint data according to the maximum matching set.

28. A system as recited in claim 27, said system further comprising:

determining means for determining an occurrence of a fault in said first or second fiber ring;

re-calculating means for re-calculating the demand matrix based upon the occurrence of the fault; and transmitting means for transmitting non-critical packets on an appropriate one of said first and second fiber rings so as to reach a destination node.

29. A system for creating a reservation map for communications, said system comprising:

creating means for creating a demand matrix based upon demand data from a plurality of nodes connected on a network;

configuring means for configuring a bipartite graph based upon the demand matrix and a series of collision groups;

selecting means for selecting an unallocated time slot from a plurality of time slots in a reservation frame, said time slot having a maximum number of allocation constraints among the unallocated time slots;

modifying means for modifying the bipartite graph based upon the allocation constraints of said time slot, wherein indications of said allocation constraints are removed from the bipartite graph;

creating means for creating a maximum matching set for the adjusted bipartite graph;

decrementing means for decrementing a weight of original graph edges included in the maximum matching set;

creating means for creating a reservation map time slot for the selected time slot based upon the maximum matching set; and updating means for updating time slot constraint data according to the maximum matching set.

* * * * *